United States Patent
Bak et al.

(10) Patent No.: US 8,420,248 B2
(45) Date of Patent: Apr. 16, 2013

(54) ELECTRODE ASSEMBLY AND SECONDARY BATTERY USING THE SAME

(75) Inventors: Hyorim Bak, Yongin-si (KR); Youngchurl Chang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 154 days.

(21) Appl. No.: 12/126,230

(22) Filed: May 23, 2008

(65) Prior Publication Data

US 2008/0292966 A1 Nov. 27, 2008

(30) Foreign Application Priority Data

May 25, 2007 (KR) .......................... 10-2007-0051094

(51) Int. Cl.
*H01M 2/14* (2006.01)
*H01M 2/16* (2006.01)
*H01M 2/18* (2006.01)

(52) U.S. Cl.
USPC ........... 429/144; 429/129; 429/142; 429/247; 429/251

(58) Field of Classification Search .................. 429/246, 429/129, 142, 144, 247, 251
See application file for complete search history.

(56) References Cited

U.S. PATENT DOCUMENTS

| 7,081,142 | B1* | 7/2006 | Carlson | 29/623.5 |
| 2006/0134526 | A1 | 6/2006 | Han et al. | |
| 2006/0222934 | A1 | 10/2006 | Min et al. | |
| 2006/0257729 | A1* | 11/2006 | Lee | 429/174 |
| 2007/0059605 | A1* | 3/2007 | Nakamura et al. | 429/246 |
| 2007/0072083 | A1* | 3/2007 | Ikuta et al. | 429/246 |
| 2007/0082261 | A1* | 4/2007 | Lee | 429/144 |
| 2007/0122715 | A1* | 5/2007 | Fujino et al. | 429/251 |
| 2007/0292765 | A1 | 12/2007 | Inoue et al. | |
| 2008/0274410 | A1* | 11/2008 | Baba et al. | 429/251 |
| 2011/0206982 | A1 | 8/2011 | Han et al. | |

FOREIGN PATENT DOCUMENTS

| EP | 1 139 468 A1 | 10/2001 |
| EP | 1 777 761 A2 | 4/2007 |
| JP | 2003-217673 | 7/2003 |
| JP | 2006-107847 | 4/2006 |

(Continued)

OTHER PUBLICATIONS

Ceramic. Dictionary.com. Dictionary.com Unabridged. Random House, Inc. http://dictionary.reference.com/browse/ceramic (accessed: Aug. 18, 2010).*

Japanese Office Action dated Dec. 6, 2011 issued by the JPO for corresponding Japanese Patent Application No. 2008-136479, 3 pages.

(Continued)

*Primary Examiner* — Basia Ridley
*Assistant Examiner* — Sean P Cullen
(74) *Attorney, Agent, or Firm* — Christie, Parker & Hale, LLP

(57) ABSTRACT

An electrode assembly and a secondary battery including the same. The electrode assembly includes: a positive electrode plate including a positive electrode active material applied to a positive electrode collector; a negative electrode plate including a negative electrode active material applied to a negative electrode collector; a separator disposed between the positive electrode plate and the negative electrode plate; and a ceramic layer disposed on a portion of the positive or negative electrode plate, adjacent to an outer surface of the electrode assembly. The positive electrode plate, the negative electrode plate, ceramic layer, and the separator are wound together. The ceramic layer prevents a short-circuit between the positive electrode plate and the negative electrode plate, and extends along between about 40% and 90% of the length of the positive or negative electrode plate, from a winding end thereof.

15 Claims, 10 Drawing Sheets

FOREIGN PATENT DOCUMENTS

| | | |
|---|---|---|
| JP | 2006-147569 | 6/2006 |
| JP | 2007-103342 | 4/2007 |
| JP | 2008-041581 | 2/2008 |
| KR | 10-2000-0051738 | 8/2000 |
| KR | 10-2001-0095076 | 11/2001 |
| KR | 10-2005-0092605 | 9/2005 |
| KR | 10-2006-0102251 | 9/2006 |
| WO | WO 2006/061940 A1 | 6/2006 |

OTHER PUBLICATIONS

European Search Report dated May 23, 2011, for corresponding European Patent application 08251814.3.
Patent Abstracts of Japan, and English machine translation of Japanese Publication 2006-107847, listed above, 18 pages.

* cited by examiner

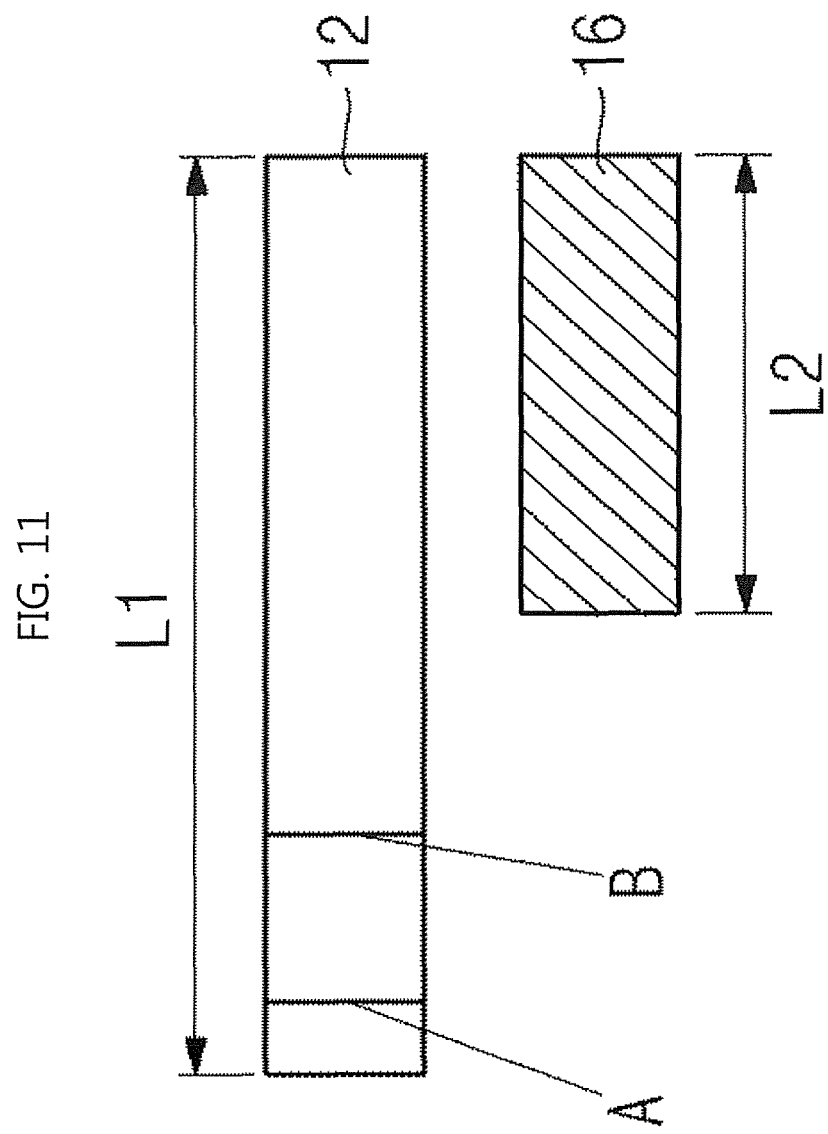

ELECTRODE ASSEMBLY AND SECONDARY BATTERY USING THE SAME

CROSS-REFERENCE TO RELATED APPLICATIONS

This application claims the benefit of Korean Application No. 2007-51094 filed May 25, 2007, in the Korean Intellectual Property Office, the disclosure of which is incorporated herein by reference.

BACKGROUND OF THE INVENTION

1. Field of the Invention

Aspects of the present invention relate to an electrode assembly and a secondary battery using the same, and more particularly, to an electrode assembly that includes a ceramic layer disposed adjacent to an outer surface of the electrode assembly, and a secondary battery using the same.

2. Description of the Related Art

Generally, a lithium secondary battery can be rechargeable, and thus, repeatedly usable, which is different from a primary battery, which cannot be recharged. Secondary batteries are widely used as main power sources in high-technology electronic devices, such as, a personal digital assistant (PDA), a notebook computer, and the like. Currently, interest in secondary batteries is increasing and the development of secondary batteries is also being rapidly performed. This is because secondary batteries are generally lightweight, have high energy densities, high output voltages, low discharge rates, and long lifespans.

Secondary batteries are classified into nickel-metal hydride (Ni-MH) batteries, lithium ion (Li-ion) batteries, and the like, based on electrode active materials used therein. The lithium ion (Li-ion) batteries may be classified based on the type of electrolyte, for example, a liquid electrolyte, a solid electrolyte, or a gel-type electrolyte. Also, the secondary batteries are classified into various types, such as, a can type, a pouch type, and the like, based on the shape of a can within which the electrode assembly is disposed.

A lithium ion (Li-ion) battery has an operational voltage of about 3.6V, and is three times more compact than a Ni—Cd battery, or a Ni-MH battery. Also, since the weight-to-energy density of a lithium-ion battery is high, lithium-ion batteries are being rapidly developed. Lithium-ion batteries do not use heavy metals, such as cadmium (Cd) and mercury (Hg), and thus, are more environmentally friendly. A lithium ion battery can be recharged at least one thousand times, in a normal state. Accordingly, with the development in information communication technologies, research into secondary batteries is rapidly occurring, based on the above-described advantages.

Generally, a lithium ion battery (hereinafter referred to as "secondary battery"), includes a can, an electrode assembly, and a cap assembly. The can is in a hollow structure that includes an opening on one side. The opening of the can is sealed by the cap assembly. In other words, the can and the cap assembly form an external case of the secondary battery. The electrode assembly is contained within the can, the opening of the can is sealed by the cap assembly, electrolyte is injected in the can through an opening in the cap, and then the opening is sealed.

The rechargeable electrode assembly includes a positive electrode plate, a negative electrode plate, and a separator disposed between the positive electrode plate and the negative electrode plate. The components of the electrode assembly are wound together. The positive electrode plate includes a positive electrode collector made of a metal foil having an excellent conductivity, for example, aluminum (Al) foil, and a positive electrode active material is coated on both surfaces of the positive electrode collector. Positive electrode non-coating portions, where the positive electrode active material is not coated, are formed on both ends of the positive electrode plate.

The negative electrode plate includes a negative electrode collector made of a conductive metal foil, for example, a copper (Cu) or nickel (Ni) foil, and a negative electrode active material coated on both surfaces of the negative electrode collector. Negative electrode non-coating portions, where the negative electrode active material is not coated, are formed on both ends of the negative electrode plate. Electrode taps are attached to each of the positive electrode non-coating portion and the negative electrode non-coating portion.

As described above, a basic function of the separator is to separate the positive electrode plate from the negative electrode plate, and thereby prevent a short-circuit between the two plates. It is important that the separator absorbs an electrolyte needed for a battery reaction, and has high ion conductivity. In particular, in the case of the lithium ion battery, there is a need to prevent the movement of materials that obstruct the battery reaction, and/or protect against the occurrence of abnormalities. The separator generally includes a polyethylene-based, porous, polymer film, such as, polypropylene, polyethylene, and the like, in one or more layers.

However, the porous film of existing separators is formed as a sheet or film. Accordingly, there are disadvantages that pores of the porous film are blocked, due to generated heat, which can be caused by an internal short-circuit, or overcharging, which cause the sheet-typed separator to contract. When the sheet-typed separator contracts, due to the generated heat, the positive electrode plate contacts the negative electrode plate, where the contraction occurs, and thereby causing the internal short-circuit. Such a short circuit can result in a fire or an explosion.

The film-typed separator may shut-down a secondary battery, by inhibiting the movement of lithium ions, that is, by preventing the flow of current, by softening the polypropylene or polyethylene resin, when the short-circuit and the heat generation occurs. However, the film-typed separator has a fragile structure. For example, in a nail test, which is a simulated internal short-circuit, the temperature at the internal short-circuit locally exceeds millions of ° C., and thus, the transformation of the porous film may be accompanied by the softening or loss of resin, which allows the nail to penetrate the positive electrode and the negative electrode, thereby causing abnormal overheating. Accordingly, the shut-down effect of a resin may not completely prevent the internal short-circuit.

Specifically, as it is required to stably prevent the internal short-circuit between the electrodes, even at a high temperature, a separator including a ceramic layer is provided. The ceramic layer includes a porous film which is formed by coupling ceramic particles with a binder. The separator may be referred to as a ceramic separator. The ceramic layer may be used alone, or along with an existing resin separator.

The ceramic layer of the ceramic separator may be coated on a plate of the electrode assembly. If an internal short-circuit of the battery occurs, the ceramic layer does not contract or melt. Also, the ceramic layer has good charging and discharging properties, and high efficiency, due to having a high porosity. Since the ceramic layer quickly absorbs an electrolyte, an injection speed of the electrolyte is improved.

However, the material cost may increase upon forming of a ceramic layer. Also, the ceramic layer is generally added to an existing resin separator, and thus, the entire volume of a secondary battery may increase, and the mass-to-battery capacity of the secondary battery may be reduced.

SUMMARY OF THE INVENTION

Aspects of the present invention provide an electrode assembly of a secondary battery that includes a ceramic layer to improve the safety of the secondary battery. The electrode assembly can be produced at a lower cost, and can have an increased mass-to-battery capacity, according to the addition of the ceramic layer. Aspects of the present invention also relate to a secondary battery using the electrode assembly.

According to an aspect of the present invention, there is provided an electrode assembly of a secondary battery, including: a positive electrode plate comprising a positive electrode active material applied to a positive electrode collector; a negative electrode plate comprising a negative electrode active material applied to a negative electrode collector; a separator disposed between the positive electrode plate and the negative electrode plate; and a ceramic layer to prevent a short-circuit between the positive electrode plate and the negative electrode plate, extending from a winding end of the positive electrode plate, along between about 40% and about 90% of the length of the positive electrode plate. The positive electrode plate, the negative electrode plate, the ceramic layer, and the separator are wound together.

According to some embodiments, the ceramic layer may extend along less than 70% of the length of the positive electrode plate, from the winding end. The winding end is located at an outer ring of the electrode assembly.

According to some embodiments, the ceramic layer may extend along between about 45% and about 70% of the length of the positive electrode plate, from the winding end.

According to some embodiments, the separator may include a polymer resin film, and the ceramic layer may be formed on at least one surface of the separator.

According to some embodiments, the ceramic layer may be formed on at least one surface of the negative electrode plate.

According to some embodiments, the negative electrode plate may include a non-coating portion, where the negative electrode active material is not applied to the negative electrode plate, and the ceramic layer may cover the non-coating portion. The ceramic layer may be formed on a layer of the negative electrode active material applied to the negative electrode plate.

According to some embodiments, the ceramic layer may be formed on at least one surface of the positive electrode plate. In this instance, the positive electrode plate may include a non-coating portion, where the positive electrode active material is not applied on the positive electrode collector, and the ceramic layer may cover the non-coating portion. Also, the ceramic layer may be formed on a layer of the positive electrode active material applied on the positive plate.

According to some embodiments, the negative electrode plate may be wound in an outer location than the positive electrode plate, and the ceramic layer may be formed on one of both surfaces of the negative electrode plate, the one surface facing the positive electrode plate.

According to some embodiments, the positive electrode plate may be wound outside of the negative electrode plate, and the ceramic layer may be formed on a surface of the negative electrode plate, facing the positive electrode plate.

According to another aspect of the present invention, there is provided an electrode assembly of a secondary battery including: a positive electrode plate including a positive electrode active material applied to a positive electrode collector; a negative electrode plate including a negative electrode active material applied to a negative electrode collector; and a separator disposed between the positive electrode plate and the negative electrode plate. The positive electrode plate, the negative electrode plate, and the separator are wound together. The electrode assembly comprises a ceramic layer, which is formed in a location to prevent a short-circuit between the positive electrode plate and the negative electrode plate. The ceramic layer is formed along between about 40% and about 90% of the length of the negative electrode plate, from a winding end of the negative electrode plate. The winding end is located at an outer ring of the electrode assembly.

According to an aspect of the present invention, there is provided a secondary battery including: a can having an opening formed on one side; an electrode assembly disposed in the can. The electrode assembly comprises: a positive electrode plate including a positive electrode active material applied to a positive electrode collector; a negative electrode plate including a negative electrode active material applied to a negative electrode collector; a separator disposed between the positive electrode plate and the negative electrode plate. The positive electrode plate, the negative electrode plate, and the separator are wound together. The electrode assembly further comprises a ceramic layer formed in a location to prevent a short-circuit between the positive electrode plate and the negative electrode plate. The ceramic layer extends along between about 40% and about 90% of the length of the positive electrode plate, from a winding end of the positive electrode plate. The secondary battery further comprises a cap assembly comprising a cap plate to seal the opening of the can, and an electrode terminal coupled with the cap plate in an insulated state, and electrically connected to the electrode assembly.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which:

FIG. 11 illustrates a range over which a ceramic layer may be formed on an electrode, according to an exemplary embodiment of the present invention.

DETAILED DESCRIPTION OF THE EXEMPLARY EMBODIMENTS

Figure 1:
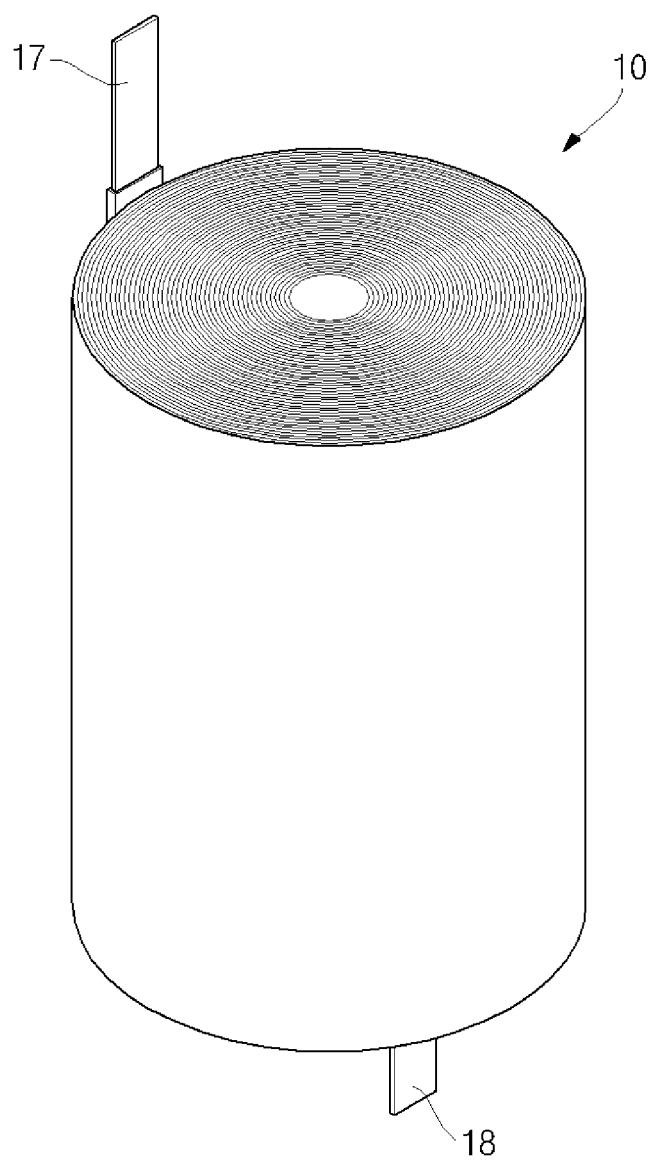
FIG. 1 is a perspective view illustrating an electrode assembly, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Figure 2:
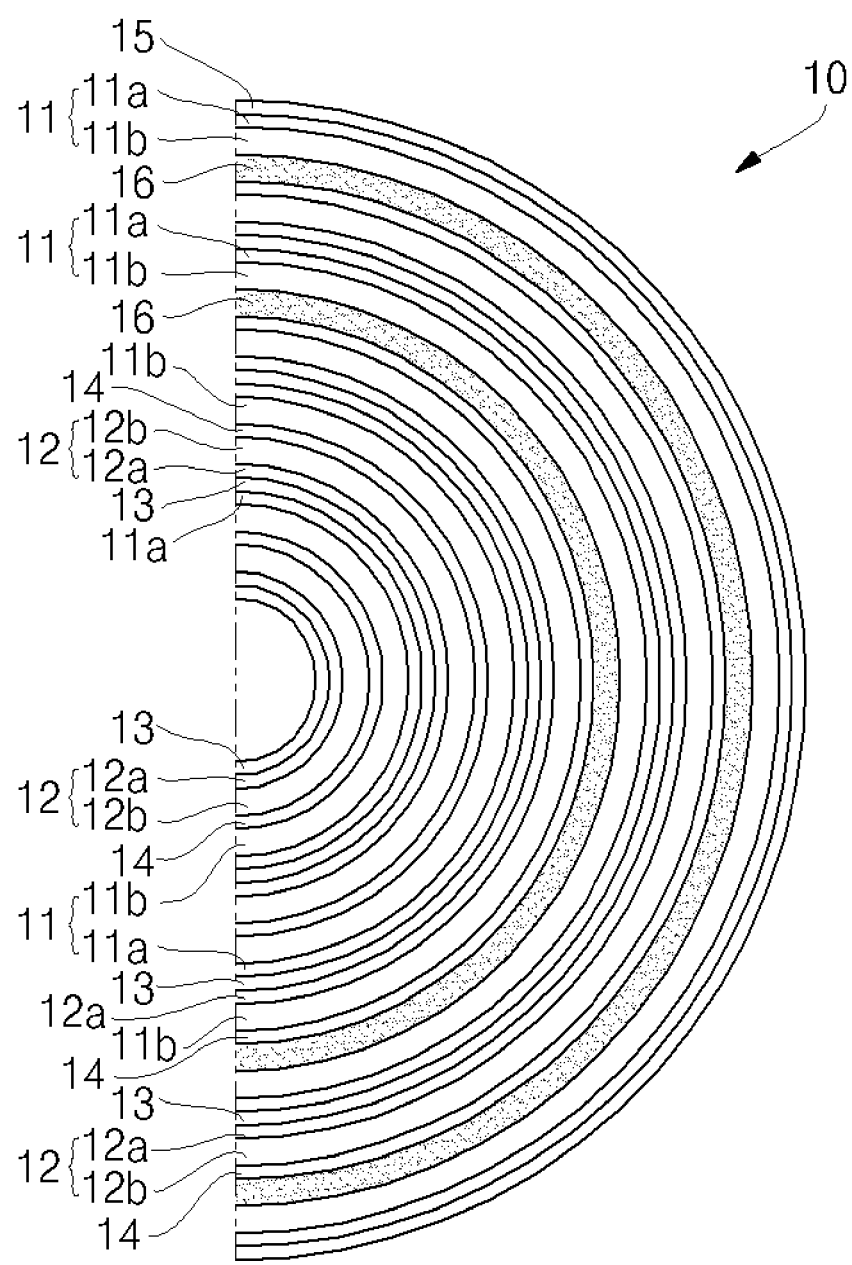
FIG. 2 is a top view of the electrode assembly of FIG. 1.
Figure 3:
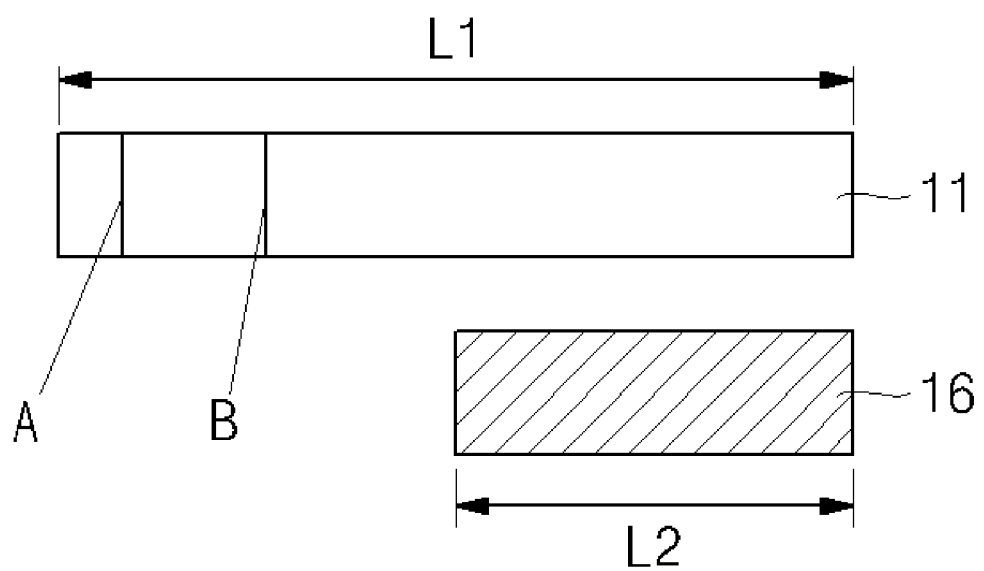
FIG. 3 illustrates a range over which a ceramic layer may be formed on an electrode assembly, according to the exemplary embodiment of FIG. 1.
Figure 4:
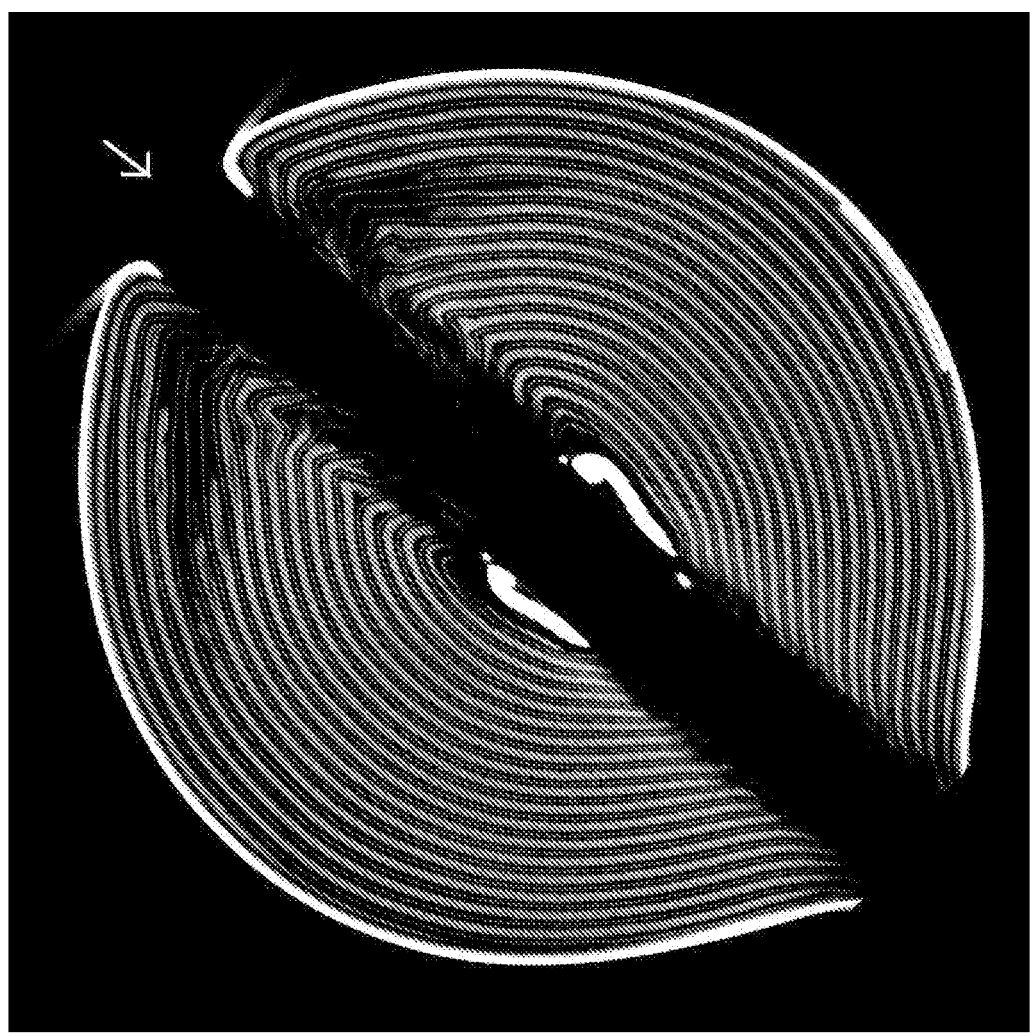
FIG. 4 is a cross-sectional view illustrating a CT photograph of a nail test of an electrode assembly, employing an existing ceramic separator.

FIG. 1 is a perspective view illustrating an electrode assembly 10, according to an exemplary embodiment of the present invention, and FIG. 2 is a top view of the electrode assembly of FIG. 1. FIG. 3 illustrates a formation range of a ceramic layer of the electrode assembly 10. FIG. 4 is a cross-sectional view illustrating a CT photograph in a nail test, of an electrode assembly employing an existing ceramic separator.

The electrode assembly 10, according to an exemplary embodiment of the present invention, includes a positive electrode plate 11, a negative electrode plate 12, separators 13, 14, and 15, a ceramic layer 16, and a pair of electrode tabs 17 and 18. The positive electrode plate 11 includes a positive electrode collector 11a, which is made of a metal thin-film with excellent conductivity, for example, an aluminum (Al) foil; and a positive electrode active material 11b that is applied on one surface of the positive electrode collector 11a.

The positive electrode active material 11b can include chalcogenide compounds. For example, a complex metal oxide, such as, $LiCoO_2$, $LiMnO_4$, $LiNiO_2$, $LiMnO_2$, and the like, may be used. However, the present invention is not limited in this regard. A region where the positive electrode active material 11b is not applied, that is, a positive electrode non-coating portion, is formed on both ends of the positive electrode collector 11a.

The negative electrode plate 12 includes a negative electrode collector 12a, which is made of a conductive metal thin-film, for example, a copper (Cu) or Nickel (Ni) foil; and a negative electrode active material 12b, which is applied on both surfaces of the negative electrode collector 12a. The negative electrode active material 12b can include a carbon-based material, Si, Sn, tin, an oxide, composite tin alloys, a transition metal oxide, a lithium metal nitride, a lithium metal oxide, and the like. However, the present embodiment is not limited in this regard. A region where the negative electrode active material 12b is not applied, that is, a negative electrode non-coating portion, is formed on both ends of the negative electrode collector 12a.

Each of the separators 13, 14, and 15 is formed of a film including a polymer resin. The separator 14 is disposed between the positive electrode plate 11 and the negative electrode plate 12, and thereby prevents a short-circuit from occurring between the two plates.

The ceramic layer 16 is included in an outer region of the electrode assembly 10. In the present exemplary embodiment, the ceramic layer 16 is formed on a portion of the separator 14 that is disposed between the positive electrode plate 11 and the negative electrode plate 12. Specifically, the ceramic layer 16 is formed on greater than 40% of the length of the positive electrode plate 11, from a winding end thereof, which is located at an outer ring of the electrode assembly 10. The ceramic layer 16 may extend along less than 90% of the length of the positive electrode plate 11, as measured from the winding end of the positive electrode plate 11.

Referring to FIG. 3, the area at which the ceramic layer 16 is disposed on the positive electrode plate 11, of the electrode assembly 10, is shown in FIG. 3. As shown in FIG. 3, the ceramic layer 16 extends along about 40% of the length of the positive electrode plate 11, from the winding end of the positive electrode plate 11. Specifically, L1 indicates the length of the positive electrode plate 11, and L2 indicates the length of the ceramic layer 16. The ratio of L1 to L2 is 5:2. Accordingly, as shown in FIG. 2, the ceramic layer 16 is located in the outer region of the electrode assembly 10.

Line "A", shown in FIG. 3, indicates a maximum length of the ceramic layer 16. Specifically, line A corresponds to 90% of the length of the positive electrode plate 11, from the winding end of the positive electrode plate 11. Line B indicates 70% of the length of the positive electrode plate 11, from the winding end of the positive electrode plate 11. The ceramic layer 16 may extend from the winding end of the positive electrode plate 11, to at least line B, and to at most line A.

The 40% length from the winding end of the positive electrode plate 11, based on the entire length of the positive electrode plate 11, indicates a minimum, or near formation range of the ceramic layer 16, which does not result in firing or explosion of the electrode assembly 10, when the electrode assembly 10 is penetrated. According to some embodiments, the ceramic layer 16 is formed to extend along about 40% to about 70% of the length of the positive electrode plate 11, from the winding end of the positive electrode plate 11. When the ceramic layer 16 is formed to less than 70% of the length of the positive electrode plate 11, the volume of electrode assembly 10 may be reduced.

According to some embodiments, the ceramic layer 16 is formed to extend along about 45% to about 70% of the length of the positive electrode plate 11, from the winding end of the positive electrode plate 11. This is because the ceramic layer 16 may be more protected from firing or explosion of the electrode assembly 10, when the ceramic layer 16 is greater than about 45% of the length of the positive electrode plate 11.

The ceramic layer 16 can be a porous film that includes secondary particles of a ceramic material and a binder. The ceramic layer 16 is formed by sintering, or melting, the secondary particles, and the re-crystallizing a portion of the same, in the binder. The secondary particles may be oriented in a radial shape (in the shape of grapes), or a sedimentary shape.

The ceramic material may include at least one of $SiO_2$, $Al_2O_3$, $ZrO_2$, and $TiO_2$. For example, ceramic material may be at least one of hydroxide, alkoxide, ketonese, and an insulating nitride, of Si, Al, Zr, and/or Ti. The binder may include polymer resin, and may include any one of a polymer of acrylate, or methacrylate, or a copolymer thereof.

The ceramic layer 16 may be formed by dipping, spraying, or printing, the positive electrode plate 11, the negative electrode plate 12, or the film separator 14 with a mixed solution of the binder, a solvent, and the secondary particles of the ceramic material. The printing generally involves using a gravure roller.

The electrode tabs 17 and 18 are attached to the positive electrode non-coating portion of the positive electrode plate 11, and the negative electrode non-coating portion of the negative electrode plate 12, respectively. The ceramic layer 16 is formed in a minimum region, where the safety of the secondary battery can be secured. As a result, it is possible to reduce the manufacturing costs of the electrode assembly 10 and the secondary battery. Also, it is possible to secure against an internal short-circuit of the secondary battery.

Referring to FIG. 4, the CT photograph shows the nail test of the electrode assembly employing an existing ceramic separator. As shown in FIG. 4, it can be seen that heat-generation, or heat-absorption, and loss of the active material, generally occur in an outer portion of the electrode assembly.

The penetration was performed in the direction of the arrow of FIG. 4. A penetrated portion of the electrode assembly, and a portion damaged by heat, is shown in black. The damaged portion is concentrated where the initial penetration of the electrode assembly occurred. Other portions that were penetrated later were not damaged by heat. This shows that the ceramic separator functions to inhibit a short-circuit caused by the heat generated during the initial penetration of the electrode assembly. Therefore, according to aspects of the present invention, although the ceramic separator is limited to the outer region of the electrode assembly, it is possible to prevent a short-circuit from occurring, due to the heat from the initial penetration of the electrode assembly, and thereby insure the safety of a secondary battery.

Referring to Table 1 below, when the ceramic layer 16 is not formed on the electrode assembly 10, or when the ceramic layer 16 is formed on less than 40% of the length from the winding end, based on the entire length of the positive electrode plate 11, all tested electrode assemblies in the nail test exploded, and the inner temperature of the batteries was 200° C., or more.

However, when the ceramic layer 16 was formed on more than about 40%, and less than around 50%, of the length of the positive electrode plate 11, from the winding end, the electrode assemblies did not explode in the nail tests, and the temperatures of the batteries was less than 100° C.

TABLE 1

| Formation range of ceramic layer (%) | Nail test results | Average temperature (° C.) |
| --- | --- | --- |
| 0 | 5 NG | 262.3 |
| 10 | 5 NG | 274.2 |
| 30 | 5 NG | 263.4 |
| 40 | 1OK 4 NG | 171.9 |
| 50 | 5 OK | 80.0 |
| 60 | 5 OK | 81.1 |
| 70 | 5 OK | 81.3 |
| 90 | 5 OK | 75.0 |
| 100 | 5 OK | 74.9 |

Figure 5:
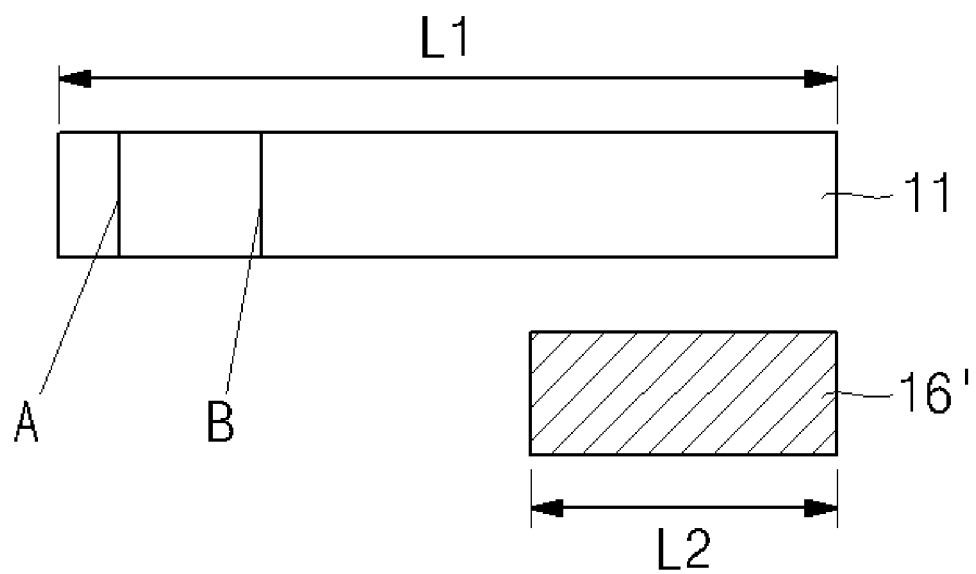
FIG. 5 illustrates a range of forming a ceramic layer of an electrode assembly, according to another exemplary embodiment of the present invention.

FIG. 5 illustrates a ceramic layer 16' formed to extend from a winding end, across 60% of the length of a positive electrode plate 11. Specifically, the ratio of L1 to L2 is 5:3, where L1 is the length of the positive electrode plate 11 and L2 is the length of the ceramic layer 16'. Lines A and B are the same as lines A and B of FIG. 3.

Figure 6:
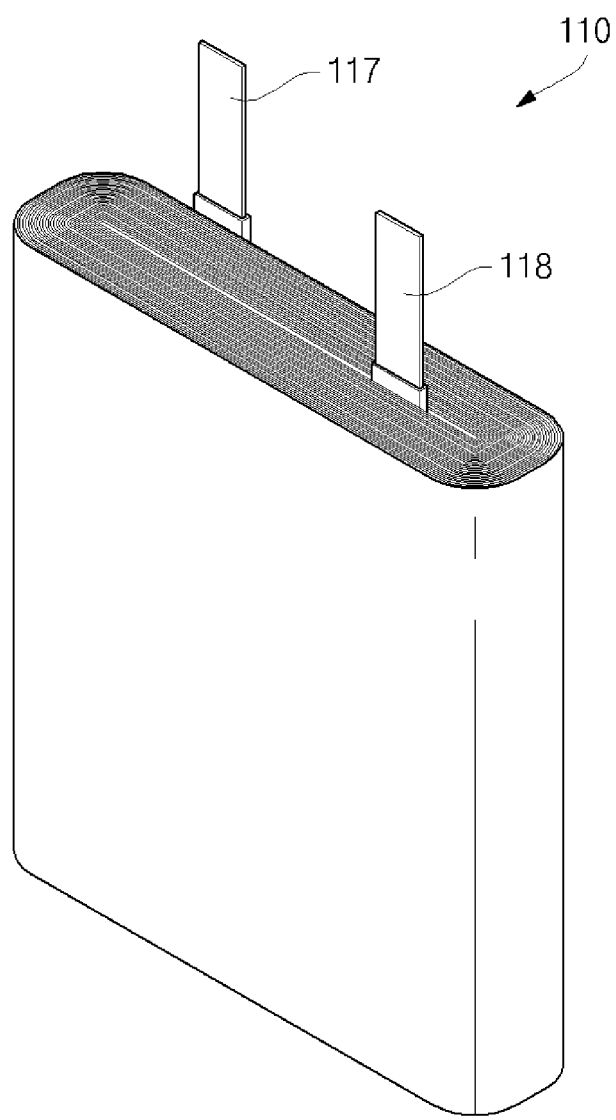
FIG. 6 is a perspective view illustrating an electrode assembly, according to still another exemplary embodiment of the present invention.
Figure 7:
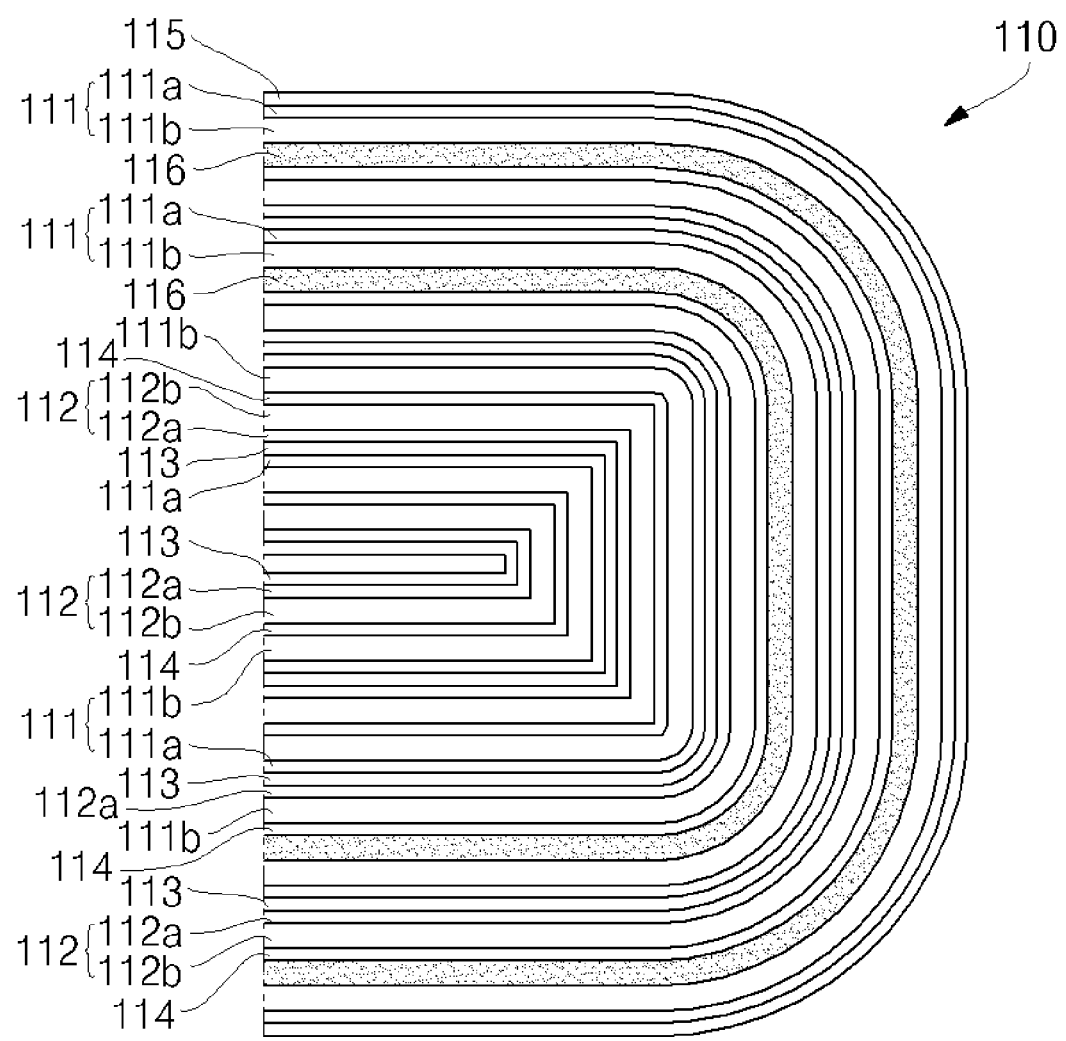
FIG. 7 is a top view of an electrode assembly, according to the embodiment of FIG. 6.
Figure 8:
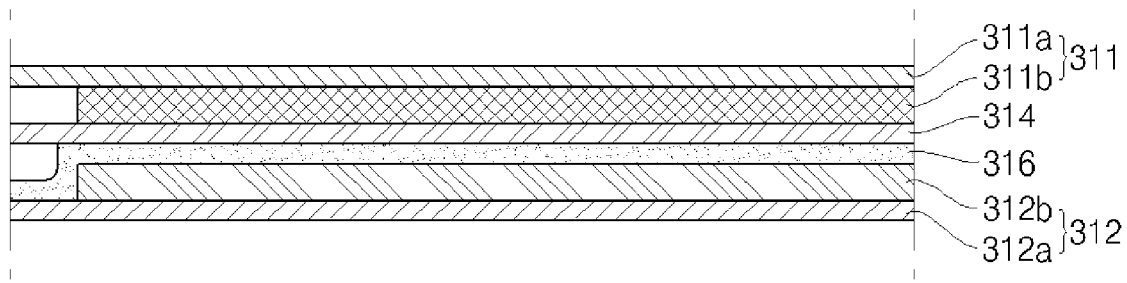
FIG. 8 is a partial cross-sectional view illustrating an electrode assembly, according to yet another exemplary embodiment of the present invention.

FIG. 6 is a perspective view illustrating an electrode assembly 110, according to still another exemplary embodiment of the present invention, and FIG. 7 is a top view of the electrode assembly 110 of FIG. 6. The electrode assembly 110 includes a positive electrode plate 111, a negative electrode late 112, separators 113, 114, and 115, a ceramic layer 116, and a pair of electrode tabs 117 and 118.

As shown in FIGS. 5 and 6, the ceramic layer 116 is formed in an outer region of the electrode assembly 110, which is rectangular. In other words, the embodiment of FIGS. 1 through 3 disposes the ceramic layer 16 in the outer region of the cylindrical electrode assembly 10, and the ceramic layer 116 is disposed in the outer regions of the rectangular electrode assembly 110. However, other basic components are the same. Accordingly, similar aspects of the present embodiment will be briefly described.

Specifically, the electrode assembly 110 includes: the positive electrode plate 111 that includes a positive electrode active material 111b applied to a positive electrode collector 111a; the negative electrode plate 112 that includes a negative electrode active material 112b applied to a negative electrode collector 112a; a pair of electrode tabs 117 and 118 attached to the positive electrode plate 111 and the negative electrode plate 112, respectively; film-type separators 113, 114, and 115; and the ceramic layer 116. The positive electrode plate 111 and the negative electrode plate 112 have the same general configuration as in the cylindrical electrode assembly 10, according to the embodiment of FIGS. 1 through 3. The separator 114 formed on one surface of the ceramic layer 116 is disposed between the positive electrode plate 111 and the negative electrode plate 112.

Specifically, the electrode assembly 110 includes: the positive electrode plate 111 that includes a positive electrode active material 111b applied to a positive electrode collector 111a; the negative electrode plate 112 that includes a negative electrode active material 112b applied to a negative electrode collector 112a; a pair of electrode tabs 117 and 118 attached to the positive electrode plate 111 and the negative electrode plate 112, respectively; film-type separators 113, 114, and 115; and the ceramic layer 116. The positive electrode plate 111 and the negative electrode plate 112 have the same general configuration (FIG. 11) as in the cylindrical electrode assembly 10, according to the embodiment of FIGS. 1 through 3. The separator 114 formed on one surface of the ceramic layer 116 is disposed between the positive electrode plate 111 and the negative electrode plate 112.

Figure 9:
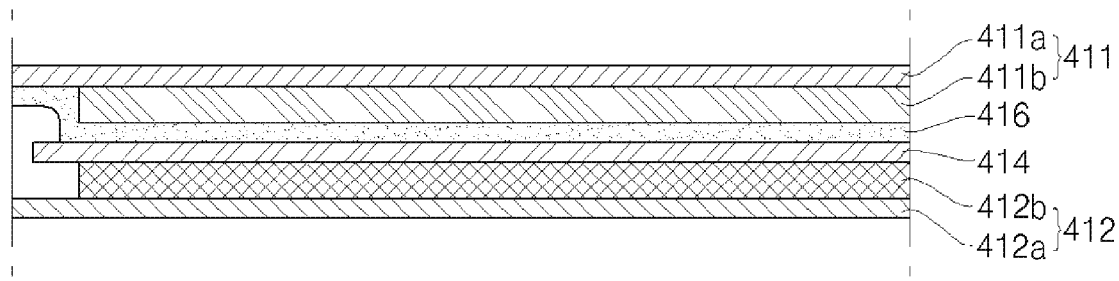
FIG. 9 is a partial cross-sectional view illustrating an electrode assembly, according to another exemplary embodiment of the present invention.

FIG. 9 is a partial cross-sectional view illustrating an electrode assembly, according to another exemplary embodiment of the present invention. As shown in FIG. 9, in the electrode assembly, a ceramic layer 416 is formed on at least one surface of a positive electrode plate 411. In this instance, the ceramic layer 416 may be formed on a section where a positive electrode active material 411b of the positive electrode plate 411 is applied, and extends to another section of a positive electrode collector 411a, where the positive electrode active material 411b is not applied, that is, a non-coating portion.

The embodiments of FIGS. 1 through 9 described the length of the ceramic layers 16, 116, 316, and 416, based on the entire length of the positive electrode plates 11, 111, 311, and 411, respectively. However, in the electrode assembly, the length of a positive electrode plate is generally the same as, or almost same as, the length of a corresponding negative electrode plate. Accordingly, applying the configuration of the ceramic layers 16, 116, 316, and 416, according to the embodiments of FIGS. 1 through 9, based on the entire length of the negative electrode plates 12, 112, 312, and 412, (FIG. 11) will result in the same operations.

Figure 10:
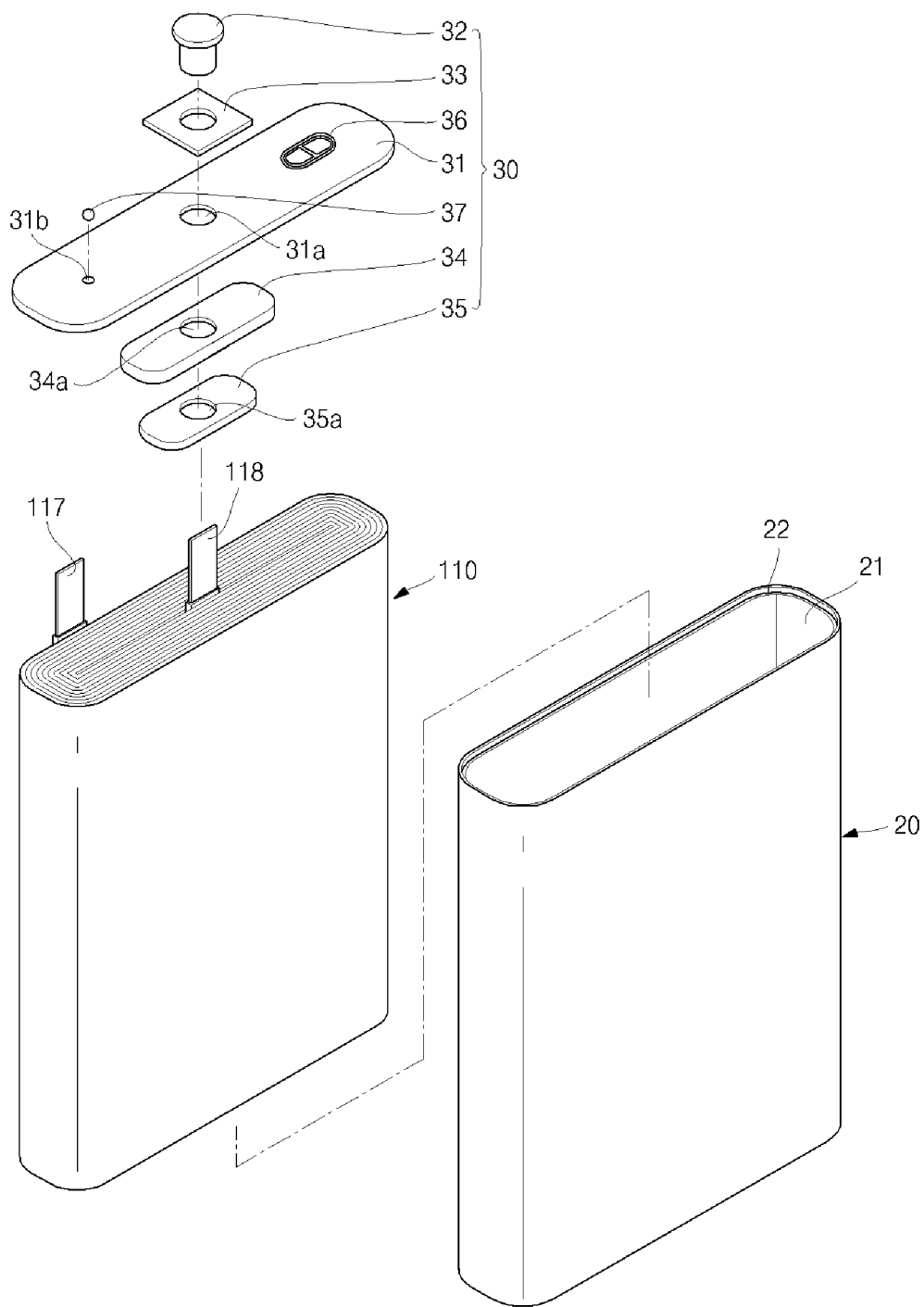
FIG. 10 is an exploded-perspective view illustrating an embodiment of a secondary battery employing an electrode assembly, according to each of the embodiments of FIGS. 5 and 6.

FIG. 10 is an exploded perspective view illustrating an exemplary embodiment of a secondary battery employing an electrode assembly 110, according to the embodiments of FIGS. 5 and 6. The secondary battery includes an electrode assembly 110, a can 20, and a cap assembly 30. Since the electrode assembly 10 has been described above, with reference to FIGS. 5 and 6, a detailed description thereof is omitted.

The can 20 is formed in a shape of a rectangular prism, or a nearly rectangular prism. The can 20 includes an opening on one side and the electrode assembly 10 is inserted into the can 20, via the opening. The can 20 may be formed of any one of Al, a Ni plated aluminum, Fe, SUS, Cu, a Cu alloy, or equivalents thereof.

The cap assembly 30 includes a cap plate 31, an electrode terminal 32, an insulation gasket 33, an insulation plate 34, a terminal plate 35, a safety vent 36, and a stopper 37. The cap plate 31 is coupled with the opening of the can 20, and thereby seals the can 20. The cap plate 31 is welded on the opening of the can 20. A stepped edge 22 is formed along the edge of the opening of the can 20. The cap plate 31 may be coupled with the opening, by being welded to the stepped edge 20. The cap plate 31 includes a terminal hole 31a, an electrolyte injection hole 31b, and the safety vent 36.

The electrode terminal 32 is inserted into the cap plate 31, via the terminal hole 31a, from the top of the cap plate 31. The electrode terminal 32 includes the insulation gasket 33, which is disposed around the electrode terminal 32, and is then inserted via the terminal hole 31a, to insulate the electrode terminal 32 from the cap plate 31.

The insulation plate 34 and the terminal plate 35 are sequentially provided below the cap plate 31. The insulation plate 34 and the terminal plate 35 are coupled with the electrode terminal 32, which is inserted via the terminal hole 31a. The terminal plate 35 is electrically connected to one pole of the electrode assembly 110. Generally, the negative pole of the electrode assembly 110 is electrically connected to the electrode terminal 32. The insulation plate 34 prevents an electrical short-circuit between the cap plate 31 and the terminal plate 35.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. An electrode assembly of a secondary battery comprising:
    a positive electrode plate comprising a positive electrode active material applied to a positive electrode collector, wherein a first positive electrode non-coating portion is formed on a winding end of the positive electrode plate, and a second positive electrode non-coating portion is formed on an end of the positive electrode plate opposite the winding end;
    a negative electrode plate comprising a negative electrode active material applied to a negative electrode collector;
    a separator disposed between the positive electrode plate and the negative electrode plate; and
    a ceramic layer to prevent a short-circuit between the positive electrode plate and the negative electrode plate, disposed along the positive electrode plate, and extending from the winding end of the positive electrode plate, along between about 40% and about 90% of the length of the positive electrode plate,
    wherein the winding end is located at an outer ring of the electrode assembly, and the positive electrode plate, the negative electrode plate, the ceramic layer, and the separator are wound together.

2. The electrode assembly as claimed in claim 1, wherein the ceramic layer extends along less than about 70% of the length of the positive electrode plate, from the winding end, which is located at the outer ring of the electrode assembly.

3. The electrode assembly as claimed in claim 1, wherein the ceramic layer extends along between about 45% and about 70% of the length of the positive electrode plate, from the winding end.

4. The electrode assembly as claimed in claim 1, wherein the separator comprises a polymer resin film, and the ceramic layer is formed on at least one surface of the film.

5. The electrode assembly as claimed in claim 1, wherein the ceramic layer is formed on at least one surface of the negative electrode plate.

6. The electrode assembly as claimed in claim 5, wherein the ceramic layer is formed on a layer of the negative electrode active material.

7. The electrode assembly as claimed in claim 1, wherein the ceramic layer is formed on at least one surface of the positive electrode plate.

8. The electrode assembly as claimed in claim 1, wherein the ceramic layer is formed on a layer of the positive electrode active material.

9. The electrode assembly as claimed in claim 1, wherein the negative electrode plate is wound around the positive electrode plate, and the ceramic layer is formed on a surface of the negative electrode plate, which faces the positive electrode plate.

10. The electrode assembly as claimed in claim 1, wherein the positive electrode plate is wound around the negative electrode plate, and the ceramic layer is formed on a surface of the negative electrode plate that faces the positive electrode plate.

11. An electrode assembly of a secondary battery comprising:
    a positive electrode plate comprising a positive electrode active material applied to a positive electrode collector;
    a negative electrode plate comprising a negative electrode active material applied to a negative electrode collector, wherein a first negative electrode non-coating portion is formed on winding end of the negative electrode plate, and a second negative electrode non-coating portion is formed on an end of the negative electrode plate opposite the winding end;
    a separator being disposed between the positive electrode plate and the negative electrode plate; and
    a ceramic layer to prevent a short-circuit between the positive electrode plate and the negative electrode plate, disposed along the negative electrode plate, and extending from the winding end of the negative electrode plate, along between about 40% and about 90% of the length of the negative electrode plate,
    wherein the positive electrode plate, the negative electrode plate, and the separator are wound together, and the winding end is located in an outer ring of the electrode assembly.

12. The electrode assembly as claimed in claim 11, wherein the ceramic layer extends along less than about 70% of the length of the negative electrode plate, from the winding end.

13. The electrode assembly as claimed in claim 11, wherein the ceramic layer extends along between about 45% and about 70% of the length of the negative electrode plate, from the winding end.

14. A secondary battery comprising:
    a can having an opening;
    an electrode assembly comprising,
        a positive electrode plate comprising a positive electrode active material applied to a positive electrode collector, wherein a first positive electrode non-coating portion is formed on a winding end of the positive plate, and a second positive electrode non-coating portion is formed on an end of the positive electrode plate opposite the winding end,
a negative electrode plate comprising a negative electrode active material applied to a negative electrode collector,
a separator disposed between the positive electrode plate and the negative electrode plate, and
a ceramic layer to prevent a short-circuit between the positive electrode plate and the negative electrode plate, disposed along the positive electrode plate, and extending from the winding end of the positive electrode plate, along between about 40% and about 90% of the length of the positive electrode plate; and
a cap assembly comprising,
   a cap plate to seal the opening of the can, and
   an electrode terminal being coupled with the cap plate in an insulated state, and electrically connected to the electrode assembly,
wherein the winding end is located at an outer ring of the electrode assembly, and the positive electrode plate, the negative electrode plate, the ceramic layer, and the separator are wound together.

15. A secondary battery comprising:
a can having an opening;
an electrode assembly comprising,
   a positive electrode plate comprising a positive electrode active material applied to a positive electrode collector,
   a negative electrode plate comprising a negative electrode active material applied to a negative electrode collector, wherein a first negative electrode non-coating portion is formed on a winding end of the negative electrode plate, and a second negative electrode non-coating portion is formed on an end of the negative electrode plate opposite the winding end,
   a separator disposed between the positive electrode plate and the negative electrode plate, and
   a ceramic layer to prevent a short-circuit between the positive electrode plate and the negative electrode plate, disposed upon the negative electrode plate, and extending from the winding end of the negative electrode plate, along between about 40% and about 90% of the length of the negative electrode plate; and
a cap assembly comprising,
   a cap plate to seal the opening of the can, and
   an electrode terminal being coupled with the cap plate in an insulated state, and electrically connected to the electrode assembly,
wherein the winding end is located at an outer ring of the electrode assembly, and the negative electrode plate, the negative electrode plate, the ceramic layer, and the separator are wound together.

* * * * *